(12) United States Patent
Kuo et al.

(10) Patent No.: US 7,974,753 B2
(45) Date of Patent: Jul. 5, 2011

(54) DIRECTION AND SPEED CONTROL DEVICE FOR AN ELECTRONIC WHEELCHAIR

(75) Inventors: Yang-Chi Kuo, Kaohsiung Hsien (TW); Shih-Chia Hsieh, Kaohsiung (TW); Ying-Da Wu, Kaohsiung Hsien (TW); Shih-Wang Tu, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 871 days.

(21) Appl. No.: 12/002,018

(22) Filed: Dec. 14, 2007

(65) Prior Publication Data
US 2008/0154463 A1    Jun. 26, 2008

(30) Foreign Application Priority Data

Dec. 25, 2006   (TW) ................ 95148752 A

(51) Int. Cl.
*B62D 5/04* (2006.01)
(52) U.S. Cl. ........... 701/41; 701/72; 180/6.5; 180/65.8; 180/907
(58) Field of Classification Search ............... 701/41, 701/70, 72; 180/8.1–8.3, 8.6, 9.32, 9.34, 180/65.8, 907; 280/5.2; 345/161
See application file for complete search history.

(56) References Cited

U.S. PATENT DOCUMENTS

| 4,511,825 | A | 4/1985 | Klimo | |
|---|---|---|---|---|
| 6,615,937 | B2 * | 9/2003 | Richey et al. | 180/6.5 |
| 7,404,463 | B2 * | 7/2008 | Saiki et al. | 180/68.4 |
| 2005/0195166 | A1 * | 9/2005 | Cooper et al. | 345/161 |
| 2006/0180368 | A1 * | 8/2006 | Hsieh et al. | 180/170 |

FOREIGN PATENT DOCUMENTS

WO    WO-01/08922 A1    2/2001

OTHER PUBLICATIONS

Birlanga, Perez, "European Search Report" for EP 07 00 5658 as completed Aug. 13, 2007 (4 pages).

* cited by examiner

*Primary Examiner* — Thomas G Black
*Assistant Examiner* — Marthe Marc Coleman
(74) *Attorney, Agent, or Firm* — Winstead PC

(57) ABSTRACT

A direction and speed control device for an electronic wheelchair includes: a base member mounted on the electronic wheelchair; a manually operable pointing unit mounted on the base member and including a control stick pivotable relative to the base member; first and second three-axis g acceleration sensors, each generating a voltage output indicative of tilt of a respective one of the control stick and the base member in three orthogonal axes; and a control unit operable so as to process the voltage outputs of the first and second three-axis g acceleration sensors to generate corresponding control signals for controlling rotation direction and speed of a wheel unit of the electronic wheelchair.

14 Claims, 6 Drawing Sheets

US 7,974,753 B2

DIRECTION AND SPEED CONTROL DEVICE FOR AN ELECTRONIC WHEELCHAIR

CROSS-REFERENCE TO RELATED APPLICATION

This application claims priority of Taiwanese application no. 095148752, filed on Dec. 25, 2006.

BACKGROUND OF THE INVENTION

1. Field of the Invention

The invention relates to a direction and speed control device, more particularly to a direction and speed control device for an electronic wheelchair.

2. Description of the Related Art

A conventional direction control device for an electronic wheelchair includes a control stick that is manually operated to actuate switches, thereby resulting in signals provided to a controller for controlling moving direction of the electronic wheelchair. However, since the switches are only capable of providing indication of a desired direction and are not capable of indicating extent of movement of the control stick, control of the electronic wheelchair for making slight turns is not possible.

Referring to FIG. 1, another conventional electronic wheelchair 1 includes a direction controller 11 for sending signals to a driving control unit (not shown) to control driving operation of a wheel driving unit (not shown) in order to control in turn moving direction of the electronic wheelchair 1. With further reference to FIG. 2, the direction controller 11 includes a hollow base member 111, a circuit board 112 disposed in the base member 111, four angularly spaced apart lower sensing coils 113 disposed on the circuit board 112, a control stick 114 that extends pivotably through the base member 111 and that is disposed above and spaced apart from the circuit board 112, an upper sensing coil 115 mounted on a bottom end of the control stick 114, and a restoring spring 116 for biasing the control stick 114 to an initial non-operated position. The circuit board 112 generates direction signals corresponding to tilt of the upper sensing coil 115 relative to the lower sensing coils 113.

In operation, when a top end of the control stick 114 is pushed forward, the upper sensing coil 115 on the bottom end of the control stick 114 moves rearward relative to the lower sensing coils 113 on the circuit board 112, thereby enabling the circuit board 112 to generate a forward direction signal for driving forward movement of the electronic wheelchair 1. On the other hand, when the top end of the control stick 114 is pushed rearward, the upper sensing coil 115 on the bottom end of the control stick 114 moves forward relative to the lower sensing coils 113, thereby enabling the circuit board 112 to generate a rearward direction signal for driving rearward movement of the electronic wheelchair 1. The circuit board 112 generates one of left and right direction signals in the same manner upon pushing the control stick 114 to the left or to the right.

Through such design, the circuit board 112 is able to generate appropriate direction signals corresponding to magnitude and direction of tilt of the upper sensing coil 115 relative to the lower sensing coils 113 so that control of the electronic wheelchair 1 for making slight turns is possible.

However, in the conventional electronic wheelchair 1, the power output of the wheel driving unit is not adjusted to correspond to actual road conditions. In particular, the power output of the wheel driving unit is not increased when the electronic wheelchair 1 is moving uphill and is not reduced when the electronic wheelchair 1 is moving downhill. Moreover, use of the sensing coils 115, 113 results in a bulky design and complicates the manufacturing process.

SUMMARY OF THE INVENTION

Therefore, the object of the present invention is to provide a direction and speed control device for an electronic wheelchair that can overcome the aforesaid drawbacks associated with the prior art.

According to this invention, there is provided a direction and speed control device for an electronic wheelchair that includes a wheel unit, a wheel driving unit coupled to and driving rotation of the wheel unit, and a driving control circuit connected to and controlling driving operation of the wheel driving unit. The direction and speed control device comprises a base member, a manually operable pointing unit, first and second three-axis g acceleration sensors, and a control unit.

The base member is adapted to be mounted on the electronic wheelchair.

The pointing unit is mounted on the base member, and includes a control stick pivotable relative to the base member.

The first three-axis g acceleration sensor is mounted on the control stick, and is operable to generate a voltage output indicative of tilt of the control stick in three orthogonal axes.

The second three-axis g acceleration sensor is mounted on the base member, and is operable to generate a voltage output indicative of tilt of the base member in the three orthogonal axes.

The control unit is coupled to the first and second three-axis g acceleration sensors so as to receive the voltage outputs thereof, and is operable so as to process the voltage outputs of the first and second three-axis g acceleration sensors to generate corresponding control signals for enabling the driving control circuit to control the driving operation of the wheel driving unit in order to control in turn rotation direction and speed of the wheel unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
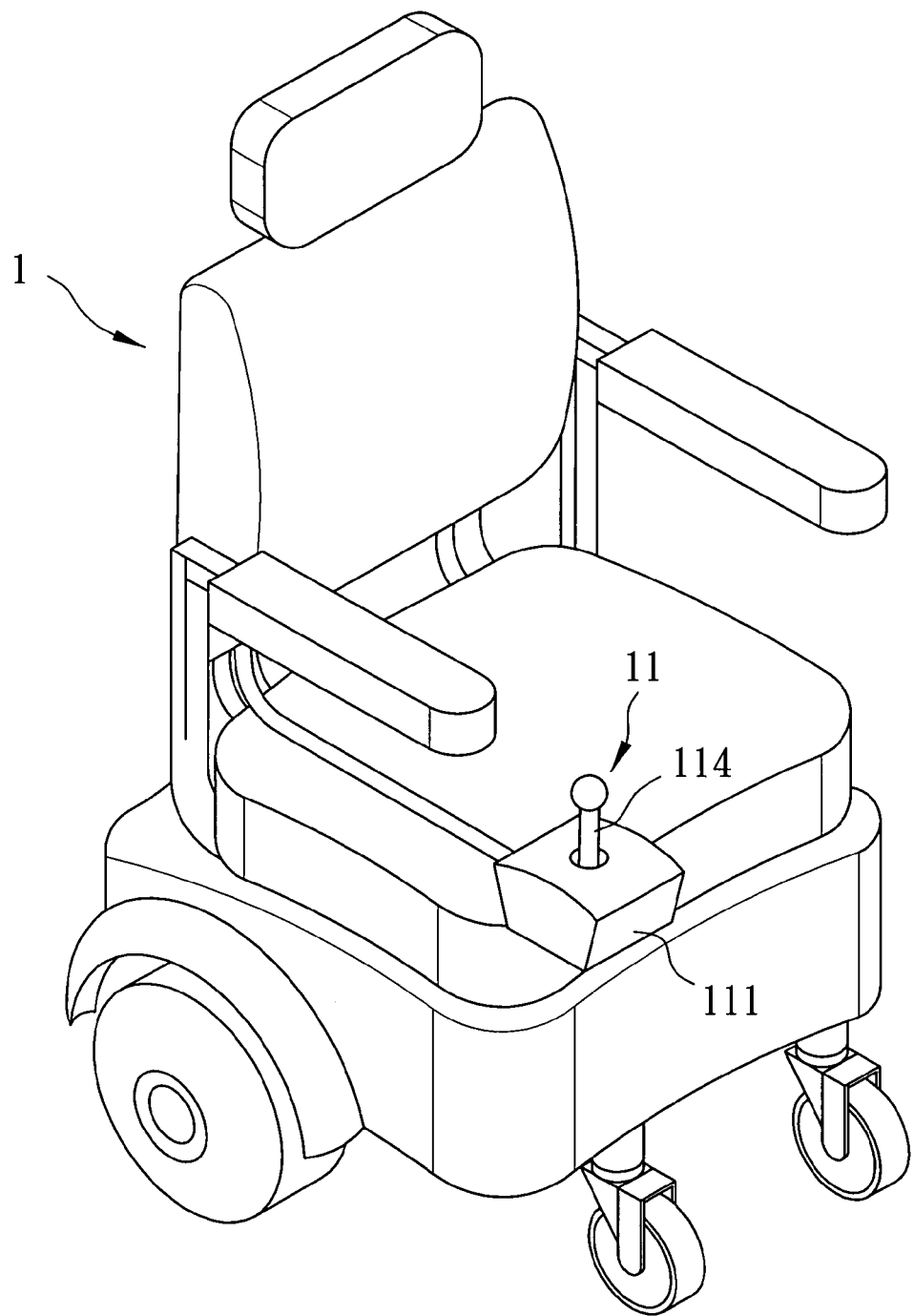
FIG. 1 is a perspective view of a conventional electronic wheelchair with a direction controller.
Figure 2:
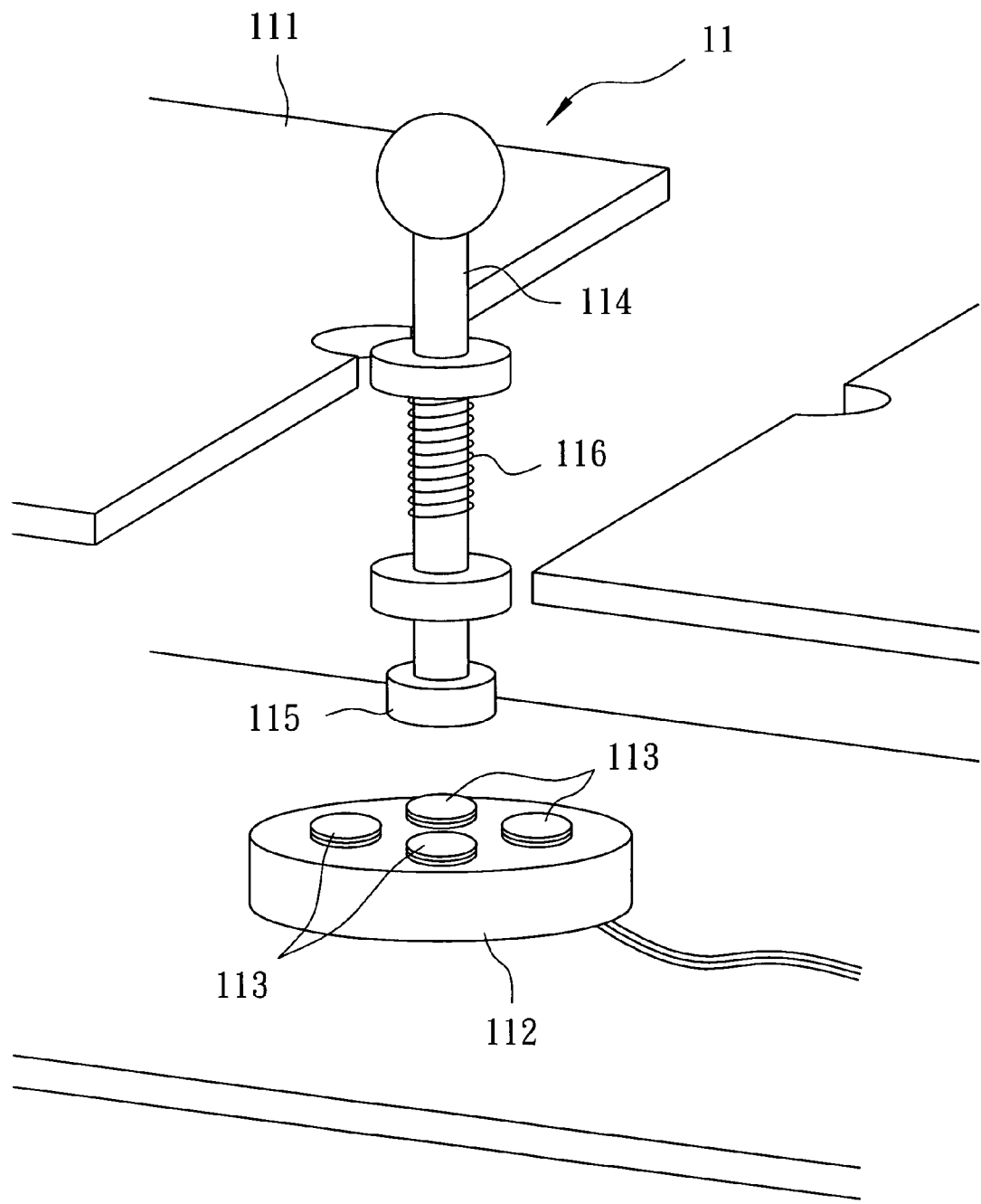
FIG. 2 is a perspective view of the conventional direction controller of FIG. 1.

Before the present invention is described in greater detail with reference to the accompanying preferred embodiments, it should be noted herein that like elements are denoted by the same reference numerals throughout the disclosure.

Figure 3:
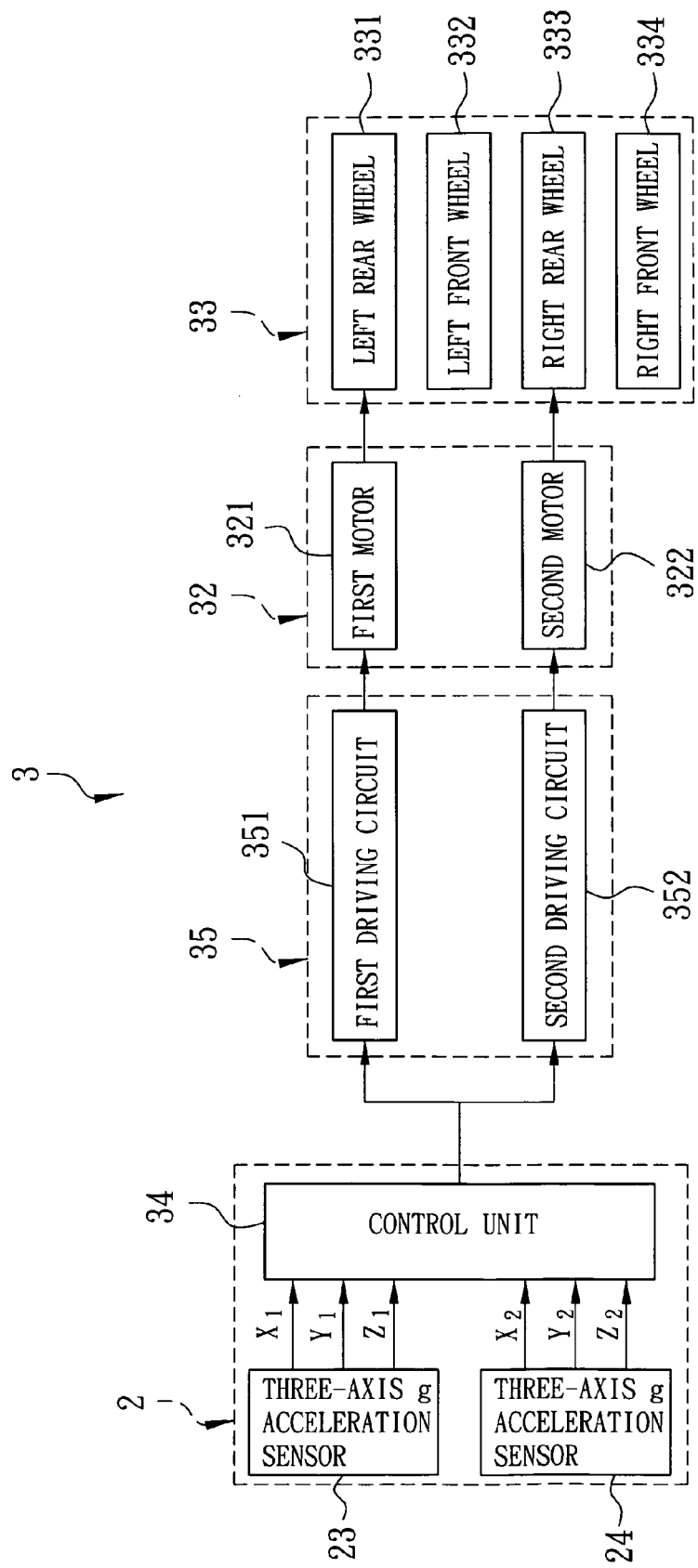
FIG. 3 is a system block diagram of an electronic wheelchair that incorporates the first preferred embodiment of a direction and speed control device according to the present invention.

Referring to FIG. 3, the first preferred embodiment of a direction and speed control device 2 according to the present invention is adapted for application to an electronic wheelchair 3. The electronic wheelchair 3 includes a wheel unit 33, a wheel driving unit 32 coupled to and driving rotation of the wheel unit 33, and a driving control circuit 35 connected to and controlling driving operation of the wheel driving unit 32.

The driving control circuit 35 includes a first driving circuit 351 and a second driving circuit 352. The wheel unit 33 includes a left rear wheel 331, a right rear wheel 333, a left front wheel 332, and a right front wheel 334. The wheel driving unit 32 includes a first motor 321 and a second motor 322.

Figure 4:
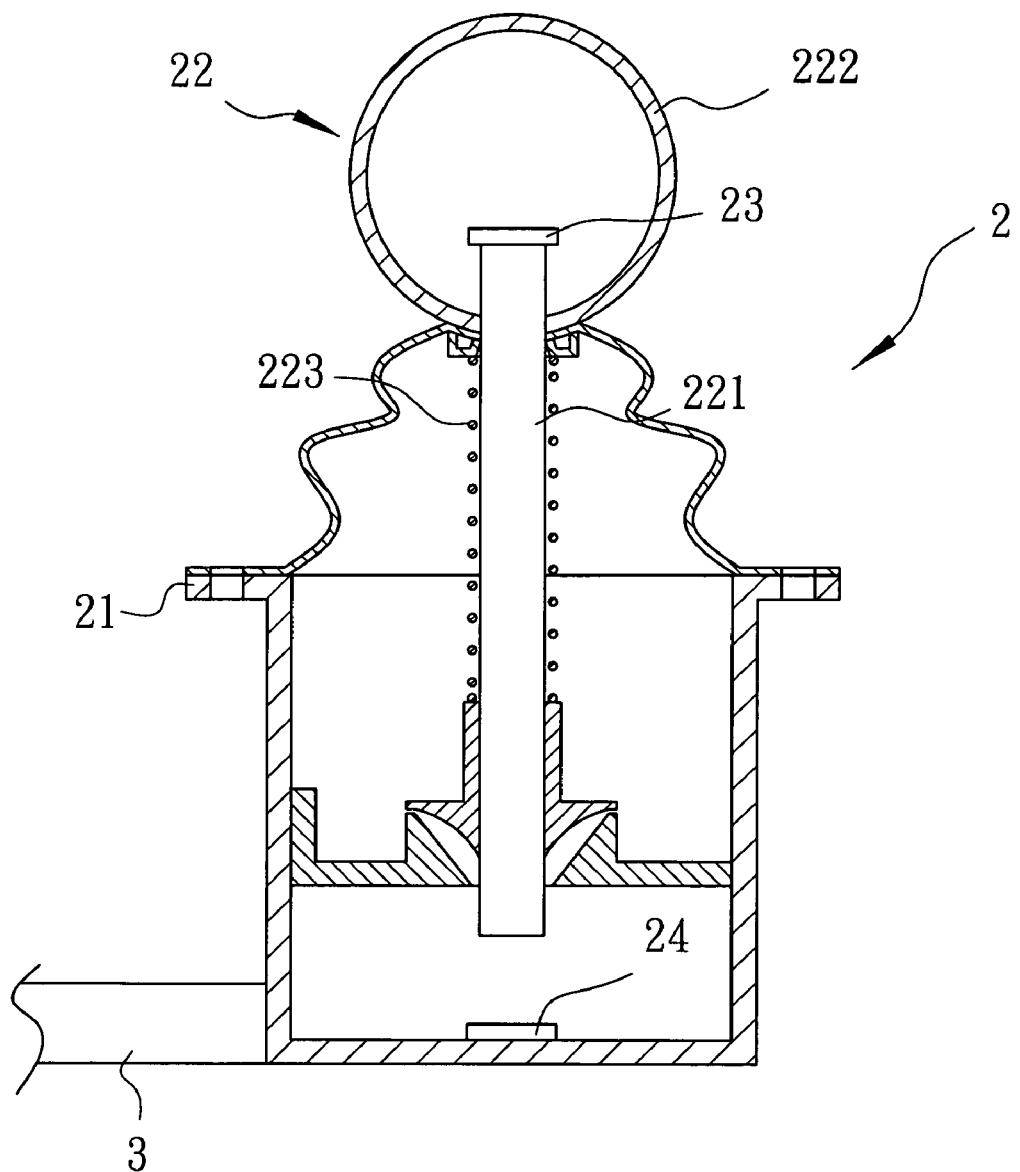
FIG. 4 is a schematic sectional view of the first preferred embodiment.

With further reference to FIG. 4, the direction and speed control device 2 includes a hollow base member 21 adapted to be mounted on the electronic wheelchair 3, a manually operable pointing unit 22 mounted on the base member 21 and including a control stick 221 pivotable relative to the base member 21, a first three-axis g acceleration sensor 23 mounted on the control stick 221 and operable to generate a voltage output indicative of tilt of the control stick 221 in three orthogonal axes, a second three-axis g acceleration sensor 24 mounted on the base member 21 and operable to generate a voltage output indicative of tilt of the base member 21 in the three orthogonal axes, and a control unit 34 coupled to the first and second three-axis g acceleration sensors 23, 24 so as to receive the voltage outputs thereof, and operable so as to process the voltage outputs of the first and second three-axis g acceleration sensors 23, 24 to generate corresponding control signals for enabling the first and second driving circuits 351, 352 of the driving control circuit 35 to control the driving operation of the first and second motors 321, 322 of the wheel driving unit 32 in order to control in turn rotation direction and speed of the left rear wheel 331 and the right rear wheel 333 of the wheel unit 33.

In this embodiment, the first and second three-axis g acceleration sensors 23, 24 are G acceleration sensors available from Freescale Inc. under Model No. MMA7260Q. The first and second three-axis g acceleration sensors 23, 24 are capable of sensing on the X, Y and Z orthogonal axes, have an operating current of 3 μA in a sleep mode and 500 μA in a normal operating mode, and a working voltage ranging between 2.2 and 3.6 volts. The package profile of each of the first and second three-axis g acceleration sensors 23, 24 in this embodiment is 6×6×1.45 mm.

In this embodiment, the pointing unit 22 further includes a hollow handle 222 mounted on a top end of the control stick 221, and a restoring spring 223 sleeved on the control stick 221. The restoring spring 223 biases the control stick 221 to an initial non-operated position, and accumulates a restoring force when the control stick 221 pivots away from the initial non-operated position.

In this embodiment, the first three-axis g acceleration sensor 23 is disposed in the hollow handle 222, and the second three-axis g acceleration sensor 24 is disposed in the base member 21 under and spaced apart from the bottom end of the control stick 221.

Figure 5:
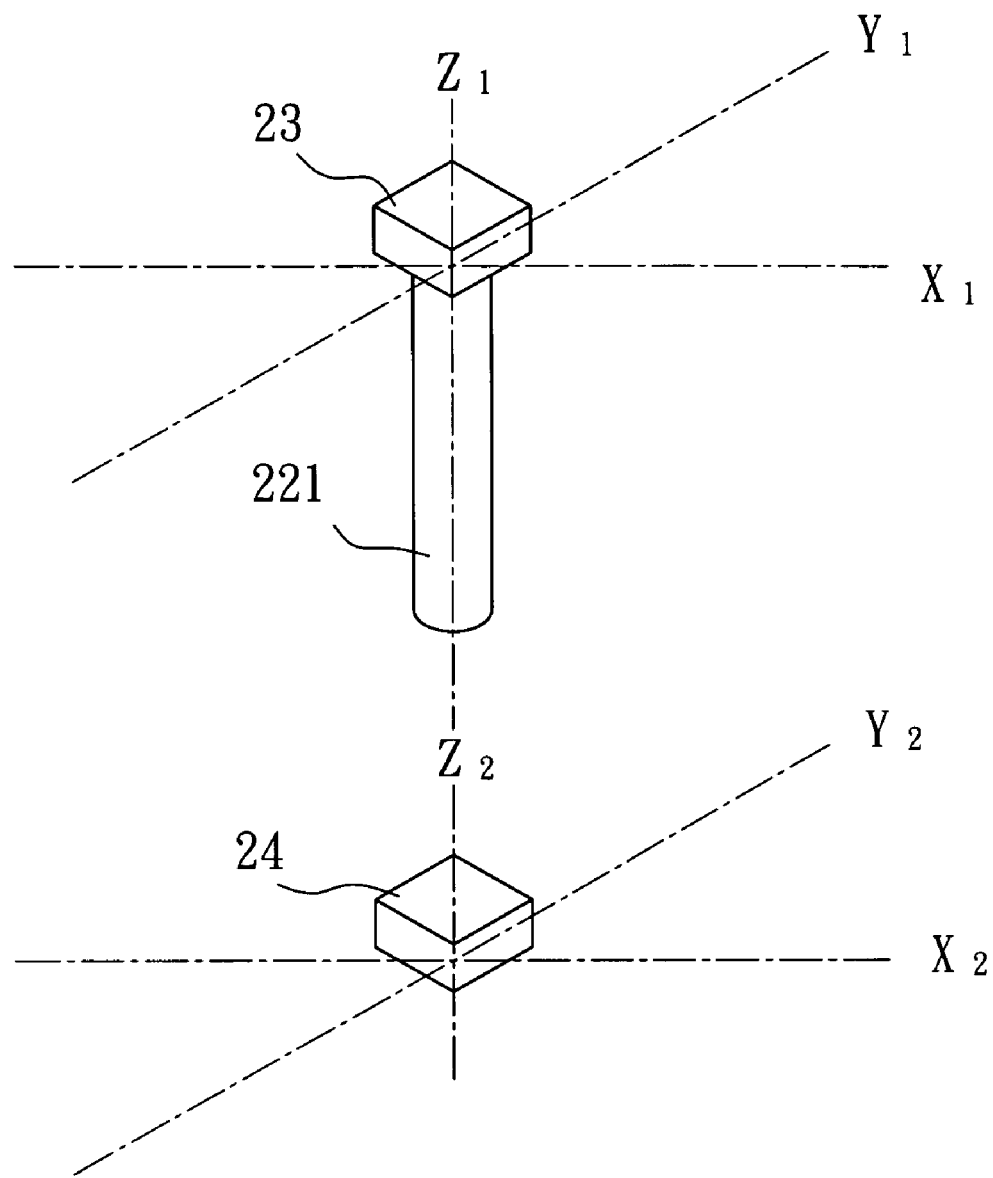
FIG. 5 is a perspective view to illustrate a position relationship of first and second three-axis g acceleration sensors of the first preferred embodiment.

Referring to FIG. 5, the voltage output components that indicate tilt of the control stick 221 and the base member 21 in the three orthogonal axes and that are generated by the first and second three-axis g acceleration sensors 23, 24 are represented by X1-Y1-Z1 and X2-Y2-Z2, respectively. The base voltage of each of the first and second three-axis g acceleration sensors 23, 24 is 2.5 volts.

When the control stick 221 is at the initial non-operated position, and the first three-axis g acceleration sensor 23 is positioned at an origin point of the X1-Y1-Z1 coordinate system, there is no change in the three-dimensional voltage outputs of the first and second three-axis g acceleration sensors 23, 24. When the control stick 221 is pivoted in a certain direction, there will be a corresponding relative change in the three-dimensional voltage outputs of the first and second three-axis g acceleration sensors 23, 24.

Referring once again to FIG. 3, the control unit 34 processes the three-dimensional voltage outputs of the first and second three-axis g acceleration sensors 23, 24, and generates control signals corresponding to a vector difference of the X-axes (X1, X2) or a vector difference of the Y-axes (Y1, Y2) and a sign of the vector difference. The control signals are provided to the first and second driving circuits 351, 352 for driving the first motor 321 to rotate the left rear wheel 331 and for driving the second motor 322 to rotate the right rear wheel 333. The left front wheel 332 and the right front wheel 334 are passively driven through the left rear wheel 331 and the right rear wheel 333, and are not driven directly by the first and second motors 321, 322.

The operation of the direction and speed control device 2 of this embodiment will now be described in greater detail with reference to FIGS. 3 to 5:

1. Making a Left or Right Turn

The control unit 34 generates the control signals for causing the electronic wheelchair 3 to turn in a desired one of left and right directions according to the X-axis components of the voltage outputs of the first and second three-axis g acceleration sensors 23, 24. For instance, when the control stick 221 is pivoted toward the right, the first three-axis g acceleration sensor 23 disposed at the top end of the control stick 221 will also tilt to the right relative to the second three-axis g acceleration sensor 24. That is, the X1 voltage component ranges between 2.5 and 3 volts, while the X2 voltage component remains at the base voltage of 2.5 volts. During processing, the control unit 34 is able to determine that the difference (X1−X2) between the X-axis voltage components of the voltage outputs of the first and second three-axis g acceleration sensors 23, 24 has a positive value (i.e., 0<X1−X2<0.5 volt).

When (X1−X2) is between 0 and 0.25 volt, the control unit 34 is able to determine that the control stick 221 was moved slightly to the right, and sends corresponding control signals to the first and second driving circuits 351, 352 such that the first driving circuit 351 drives the first motor 321 to increase its motor speed while the second driving circuit 352 drives the second motor 322 to decrease its motor speed. As a result, the rotation speed of the left rear wheel 331 is increased, while the rotation speed of the right rear wheel 333 is decreased, thereby resulting in gradual turning of the electronic wheelchair 3 to the right. The smaller the difference between X1 and X2, the slower will be the turning speed of the electronic wheelchair 3.

When (X1−X2) is between 0.25 and 0.5 volt, the control unit 34 is able to determine that the control stick 221 was moved to the right to a larger extent, and sends corresponding control signals to the first and second driving circuits 351, 352 such that the first driving circuit 351 drives the first motor 321 to rotate in the normal direction while the second driving circuit 352 drives the second motor 322 to rotate in the reverse direction. As a result, the left rear wheel 331 rotates in the normal direction while the right rear wheel 333 rotates in the reverse direction so as to result in faster turning of the electronic wheelchair 3 to the right. The larger the difference between X1 and X2, the faster will be the turning speed of the electronic wheelchair 3.

On the other hand, when the control stick 221 is pivoted toward the left, the first three-axis g acceleration sensor 23 disposed at the top end of the control stick 221 will also tilt to the left relative to the second three-axis g acceleration sensor 24. That is, the X1 voltage component ranges between 2 and 2.5 volts, while the X2 voltage component remains at the base voltage of 2.5 volts. During processing, the control unit 34 is able to determine that the difference (X1−X2) between the X-axis voltage components of the voltage outputs of the first and second three-axis g acceleration sensors 23, 24 has a negative value (i.e., −0.5 volt<X1−X2<0).

When (X1−X2) is between −0.25 and 0 volt, the control unit 34 is able to determine that the control stick 221 was moved slightly to the left, and sends corresponding control signals to the first and second driving circuits 351, 352 such that the first driving circuit 351 drives the first motor 321 to decrease its motor speed while the second driving circuit 352 drives the second motor 322 to increase its motor speed. As a result, the rotation speed of the left rear wheel 331 is decreased, while the rotation speed of the right rear wheel 333 is increased, thereby resulting in gradual turning of the electronic wheelchair 3 to the left. The smaller the difference between X1 and X2, the slower will be the turning speed of the electronic wheelchair 3.

When (X1−X2) is between −0.5 and −0.25 volt, the control unit 34 is able to determine that the control stick 221 was moved to the left to a larger extent, and sends corresponding control signals to the first and second driving circuits 351, 352 such that the first driving circuit 351 drives the first motor 321 to rotate in the reverse direction while the second driving circuit 352 drives the second motor 322 to rotate in the normal direction. As a result, the left rear wheel 331 rotates in the reverse direction while the right rear wheel 333 rotates in the normal direction so as to result in faster turning of the electronic wheelchair 3 to the left. The larger the difference between X1 and X2, the faster will be the turning speed of the electronic wheelchair 3.

2. Forward or Rearward Movement

The control unit 34 generates the control signals for causing the electronic wheelchair 3 to move in a desired one of forward and rearward directions according to the Y-axis components of the voltage outputs of the first and second three-axis g acceleration sensors 23, 24. For instance, when the control stick 221 is pivoted forward, the first three-axis g acceleration sensor 23 disposed at the top end of the control stick 221 will also tilt forward relative to the second three-axis g acceleration sensor 24. That is, the Y1 voltage component ranges between 2.5 and 3 volts, while the Y2 voltage component remains at the base voltage of 2.5 volts. During processing, the control unit 34 is able to determine that the difference (Y1−Y2) between the Y-axis voltage components of the voltage outputs of the first and second three-axis g acceleration sensors 23, 24 has a positive value (i.e., 0<Y1−Y2<0.5 volt).

Thereafter, the control unit 34 sends corresponding control signals to the first and second driving circuits 351, 352 for driving the first and second motors 321, 322 to rotate in the normal direction, thereby causing the electronic wheelchair 3 to the move forward. The larger the difference between Y1 and Y2, the faster will be the moving speed of the electronic wheelchair 3. Accordingly, the smaller the difference between Y1 and Y2, the slower will be the moving speed of the electronic wheelchair 3.

On the other hand, when the control stick 221 is pivoted rearward, the first three-axis g acceleration sensor 23 disposed at the top end of the control stick 221 will also tilt rearward relative to the second three-axis g acceleration sensor 24. That is, the Y1 voltage component ranges between 2 and 2.5 volts, while the Y2 voltage component remains at the base voltage of 2.5 volts. During processing, the control unit 34 is able to determine that the difference (Y1−Y2) between the Y-axis voltage components of the voltage outputs of the first and second three-axis g acceleration sensors 23, 24 has a negative value (i.e., −0.5 volt<Y1−Y2<0).

Thereafter, the control unit 34 sends corresponding control signals to the first and second driving circuits 351, 352 for driving the first and second motors 321, 322 to rotate in the reverse direction, thereby causing the electronic wheelchair 3 to the move rearward. The larger the difference between Y1 and Y2, the faster will be the moving speed of the electronic wheelchair 3. Accordingly, the smaller the difference between Y1 and Y2, the slower will be the moving speed of the electronic wheelchair 3.

3. Uphill or Downhill Movement

The control unit 34 determines that the electronic wheelchair 3 is moving uphill when the Z-axis component of the voltage output of each of the first and second three-axis g acceleration sensors 23, 24 is larger than a base Z-axis voltage (2.5 volts), i.e., Z1 and Z2 have values ranging between 2.5 and 3 volts. In response to determination of uphill movement, the control unit 34 sends corresponding control signals to the first and second driving circuits 351, 352 to increase rotation speed so as to result in sufficient motive power for the electronic wheelchair 3 to go uphill.

On the other hand, the control unit 34 determines that the electronic wheelchair 3 is moving downhill when the Z-axis component of the voltage output of each of the first and second three-axis g acceleration sensors 23, 24 is smaller than the base Z-axis voltage, i.e., Z1 and Z2 have values ranging between 2 and 2.5 volts. In response to determination of downhill movement, the control unit 34 sends control signals to the first and second driving circuits 351, 352 to decrease rotation speed so as to reduce motive power for the electronic wheelchair 3 when the latter moves downhill.

It is noted that the Y-axis component (Y1, Y2) of the voltage output of each of the first and second three-axis g acceleration sensors 23, 24 will undesirably deviate from the base Y-axis voltage (2.5 volts) when the electronic wheelchair 3 is moving uphill or downhill. However, since the control unit 34 is able to detect uphill or downhill movement of the electronic wheelchair 3 from the Z-axis component (Z1, Z2) of the voltage output of each of the first and second three-axis g acceleration sensors 23, 24, the control unit 34 is able to determine that the deviations in the Y-axis components (Y1, Y2) are due to uphill or downhill movement so as to avoid undesired changes in moving speed of the electronic wheelchair 3.

4. Overturning of the Electronic Wheelchair

When the electronic wheelchair 3 is overturned, the control unit 34 is able to detect that the Z-axis component of the voltage output of each of the first and second three-axis g acceleration sensors 23, 24 is outside a normal operating voltage range (2 to 3 volts). That is, both Z1, Z2 are either smaller than 2 volts or larger than 3 volts. In this case, the control unit 34 sends control signals to the first and second driving circuits 351, 352 to stop operation of the first and second motors 321, 322, thereby interrupting supply of motive power automatically when the electronic wheelchair 3 is overturned.

As mentioned hereinabove, the restoring spring 223 accumulates a restoring force whenever the control stick 221 is moved away from the initial non-operated position. By virtue of the accumulated restoring force, the control stick 221 can be restored automatically to the non-operated position once the control stick 221 is released, thereby resulting in termination of the supply of motive power in the electronic wheelchair 3 when the control stick 3 is released to promote user safety.

The following are some of the advantages of the direction and speed control device 2 of this invention:

1. Through the first and second three-axis g acceleration sensors 23, 24, the control unit 34 is able to generate appropriate control signals for the first and second driving circuits 351, 352 to control the first and second motors 321, 322 in order to control in turn rotation direction and speed of the wheel unit 33 so as to ensure stability of the electronic wheelchair 3 even on uneven ground.

2. Through the first and second three-axis g acceleration sensors 23, 24, uphill or downhill movement of the electronic wheelchair 3 as well as extent of pivoting movement of the control stick 221 can be detected so that corresponding control measures can be performed.

3. Through the restoring spring 223, the control stick 221 can be automatically restored to the non-operated position to terminate the supply of motive power in the electronic wheelchair 3 when the control stick 3 is released, thus promoting user safety. Moreover, through the first and second g acceleration sensors 23, 24, the control unit 34 is able to detect overturning of the electronic wheelchair 3 and interrupt the supply of motive power accordingly.

4. In view of the small package profile of the first and second g acceleration sensors 23, 24, the size of the direction and speed control device 2 can be reduced considerably compared to the prior art.

In addition, in view of the fact that the first and second three-axis g acceleration sensors 23, 24 operate under low current conditions (such as 500 μA), power consumption can be kept low in the direction and speed control device 2 of this invention.

Figure 6:
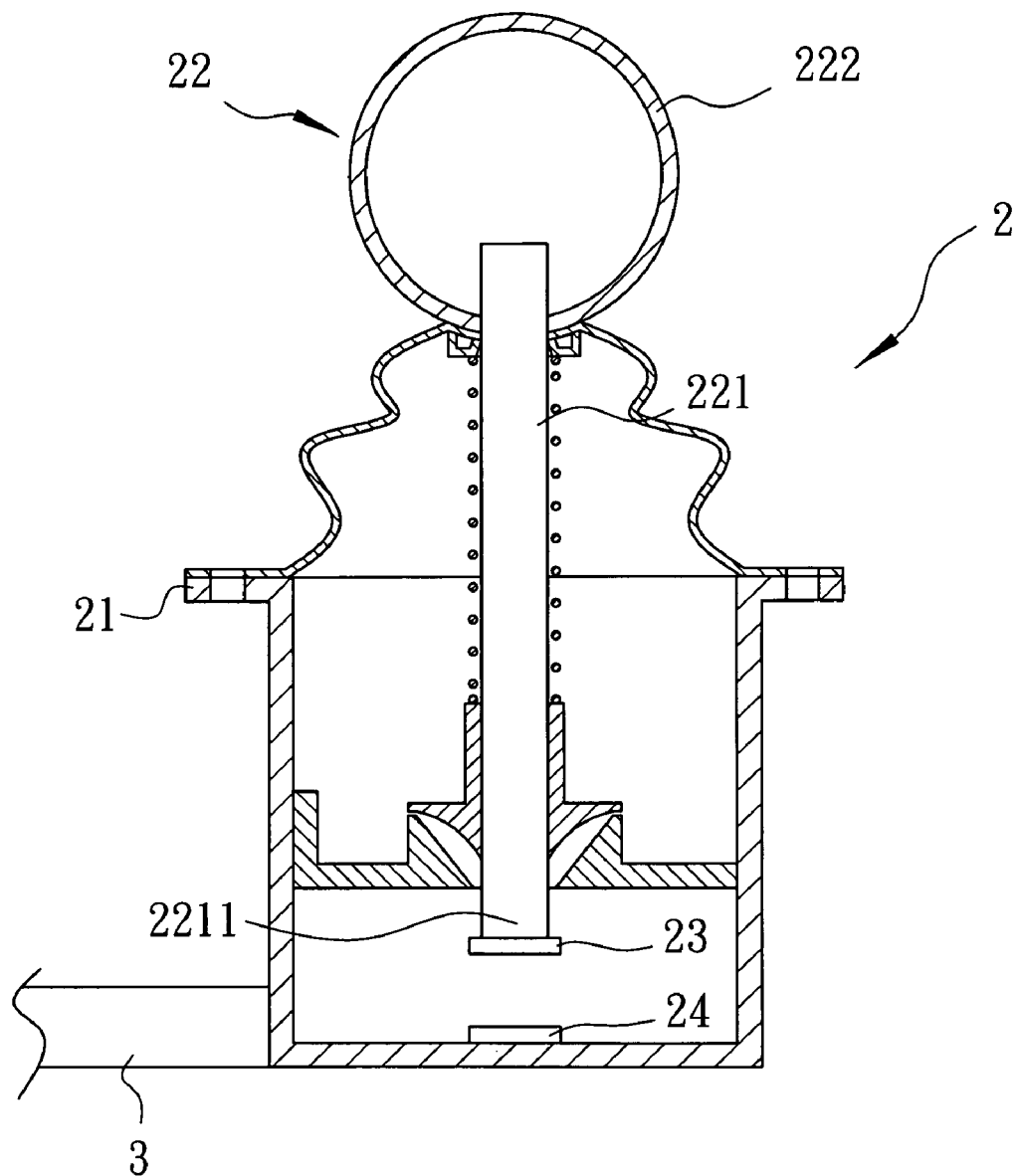
FIG. 6 is a schematic sectional view of the second preferred embodiment of a direction and speed control device for an electronic wheelchair according to the present invention.

Referring to FIG. 6, the second preferred embodiment of this invention is shown to differ from the previous embodiment in that the first three-axis g acceleration sensor 23 is mounted on a bottom end 2211 of the control stick 221.

In this embodiment, the direction of movement of the first three-axis g acceleration sensor 23 is opposite to that of the handle 222 on the control stick 221. Therefore, the control signals sent by the control unit 34 in this embodiment are opposite to those sent in the previous embodiment. In particular, when (X1–X2) has a positive value, the control unit 34 of this embodiment will send left turn control signals instead of right turn control signals. On the other hand, when (X1–X2) has a negative value, the control unit 34 of this embodiment will send right turn control signals instead of left turn control signals. When (Y1–Y2) has a positive value, the control unit 34 of this embodiment will send rearward control signals instead of forward control signals. On the other hand, when (Y1–Y2) has a negative value, the control unit 34 of this embodiment will send forward control signals instead of rearward control signals.

The effects achieved by this preferred embodiment are the same as those of the previous embodiment and will not be described further for the sake of brevity.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A direction and speed control device for an electronic wheelchair, the electronic wheelchair including a wheel unit, a wheel driving unit coupled to and driving rotation of the wheel unit, and a driving control circuit connected to and controlling driving operation of the wheel driving unit, said direction and speed control device comprising:

a base member adapted to be mounted on the electronic wheelchair;

a manually operable pointing unit mounted on said base member and including a control stick pivotable relative to said base member;

a first three-axis g acceleration sensor mounted on said control stick and operable to generate a voltage output indicative of tilt of said control stick in three orthogonal axes;

a second three-axis g acceleration sensor mounted on said base member and operable to generate a voltage output indicative of tilt of said base member in the three orthogonal axes; and a control unit coupled to said first and second three-axis g acceleration sensors so as to receive the voltage outputs thereof, and operable so as to process the voltage outputs of said first and second three-axis g acceleration sensors to generate corresponding control signals for enabling the driving control circuit to control the driving operation of the wheel driving unit in order to control in turn rotation direction and speed of the wheel unit.

2. The direction and speed control device as claimed in claim 1, wherein said control unit determines that the electronic wheelchair is moving uphill when a Z-axis component of the voltage output of each of said first and second three-axis g acceleration sensors is larger than a base Z-axis voltage, and further determines that the electronic wheelchair is moving downhill when the Z-axis component of the voltage output of each of said first and second three-axis g acceleration sensors is smaller than the base Z-axis voltage.

3. The direction and speed control device as claimed in claim 1, wherein said control unit generates the control signals for causing the electronic wheelchair to turn in a desired one of left and right directions according to X-axis components of the voltage outputs of said first and second three-axis g acceleration sensors.

4. The direction and speed control device as claimed in claim 3, wherein said control unit generates the control signals for causing the electronic wheelchair to turn right when a difference between the X-axis components of the voltage outputs of said first and second three-axis g acceleration sensors has a positive value, and further generates the control signals for causing the electronic wheelchair to turn left when the difference between the X-axis components of the voltage outputs of said first and second three-axis g acceleration sensors has a negative value.

5. The direction and speed control device as claimed in claim 4, wherein said control unit generates the control signals for controlling turning speed of the electronic wheelchair in the desired one of the left and right directions according to magnitude of an absolute value of the difference between the X-axis components of the voltage outputs of said first and second three-axis g acceleration sensors.

6. The direction and speed control device as claimed in claim 5, wherein said control unit generates the control signals for increasing the turning speed of the electronic wheelchair in the desired one of the left and right directions when the magnitude of the absolute value of the difference between the X-axis components of the voltage outputs of said first and second three-axis g acceleration sensors is increasing, and further generates the control signals for reducing the turning speed of the electronic wheel chair in the desired one of the left and right directions when the magnitude of the absolute value of the difference between the X-axis components of the voltage outputs of said first and second three-axis g acceleration sensors is decreasing.

7. The direction and speed control device as claimed in claim 1, wherein said control unit generates the control signals for causing the electronic wheelchair to move in a desired one of forward and rearward directions according to Y-axis components of the voltage outputs of said first and second three-axis g acceleration sensors.

8. The direction and speed control device as claimed in claim 7, wherein said control unit generates the control signals for causing the electronic wheelchair to move forward when a difference between the Y-axis components of the voltage outputs of said first and second three-axis g acceleration sensors has a positive value, and further generates the control signals for causing the electronic wheelchair to move rearward when the difference between the Y-axis components of the voltage outputs of said first and second three-axis g acceleration sensors has a negative value.

9. The direction and speed control device as claimed in claim 8, wherein said control unit generates the control signals for controlling moving speed of the electronic wheelchair in the desired one of the forward and rearward directions according to magnitude of an absolute value of the difference between the Y-axis components of the voltage outputs of said first and second three-axis g acceleration sensors.

10. The direction and speed control device as claimed in claim 9, wherein said control unit generates the control signals for increasing the moving speed of the electronic wheelchair in the desired one of the forward and rearward directions when the magnitude of the absolute value of the difference between the Y-axis components of the voltage outputs of said first and second three-axis g acceleration sensors is increasing, and further generates the control signals for reducing the moving speed of the electronic wheelchair in the desired one of the forward and rearward directions when the magnitude of the absolute value of the difference between the Y-axis components of the voltage outputs of said first and second three-axis g acceleration sensors is decreasing.

11. The direction and speed control device as claimed in claim 1, wherein said manually operable pointing unit further includes a hollow handle mounted on a top end of said control stick and having said first three-axis g acceleration sensor disposed therein.

12. The direction and speed control device as claimed in claim 11, wherein said manually operable pointing unit further includes a restoring spring for biasing said control stick to an initial non-operated position.

13. The direction and speed control device as claimed in claim 1, wherein said first three-axis g acceleration sensor is mounted on a bottom end of said control stick.

14. The direction and speed control device as claimed in claim 13, wherein said manually operable pointing unit further includes a restoring spring for biasing said control stick to an initial non-operated position.

* * * * *